P. A. BOLOPUE.
CHOCK.
APPLICATION FILED JUNE 27, 1916.
1,223,247.
Patented Apr. 17, 1917.
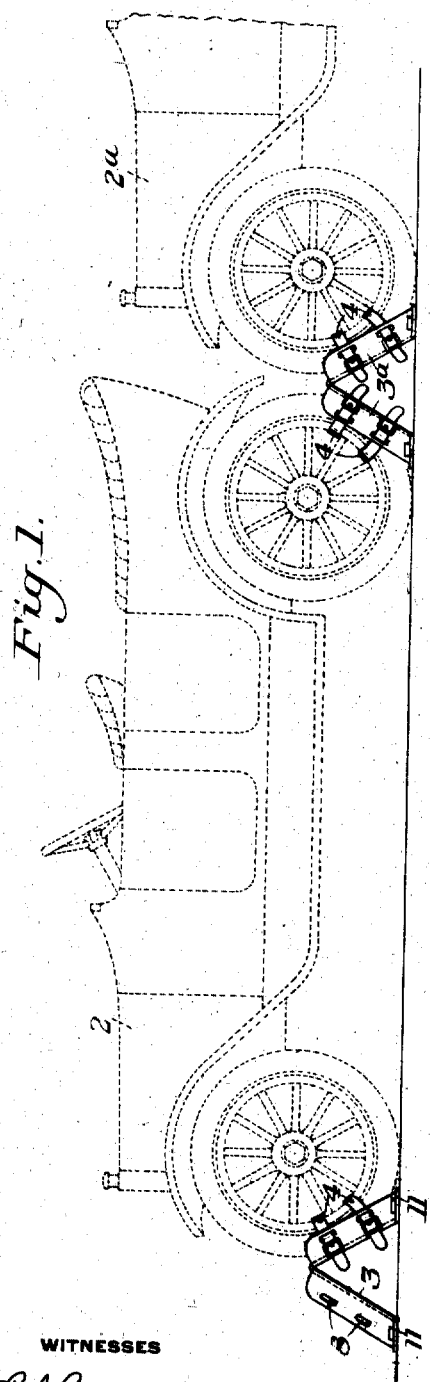
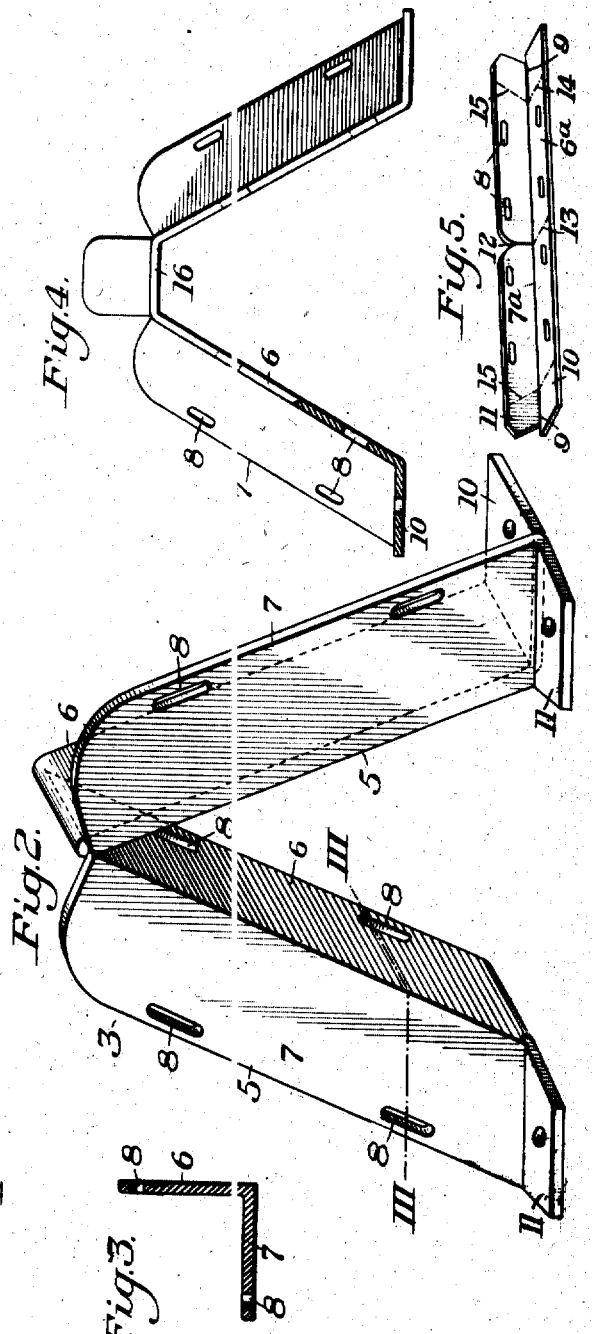
WITNESSES
R. A. Balderson
D. B. Blemming
INVENTOR
P. A. Bolopue

UNITED STATES PATENT OFFICE.

PEARL A. BOLOPUE, OF PITTSBURGH, PENNSYLVANIA.

CHOCK.

1,223,247.  Specification of Letters Patent.  Patented Apr. 17, 1917.

Application filed June 27, 1916. Serial No. 106,145.

*To all whom it may concern:*

Be it known that I, PEARL A. BOLOPUE, a citizen of the United States, and a resident of Pittsburgh, in the county of Allegheny and State of Pennsylvania, have invented a new and useful Improvement in Chocks, of which the following is a full, clear, and exact description, reference being had to the accompanying drawings, forming part of this specification, in which—

Figure 1 is a side elevation of a plurality of one form of my improved chocks, shown in position for blocking several automobiles in alinement with each other.

Fig. 2 is a perspective view of the chock shown in Fig. 1.

Fig. 3 is a detail sectional view on the line III—III of Fig. 2.

Fig. 4 is a side elevation partially in section of another form of chock, and

Fig. 5 is a perspective view of a cut blank from which the chocks shown in Figs. 1 to 3 may be formed.

This invention relates to an improvement in chocks for blocking automobiles or vehicles during shipment, and is designed to provide a cheap and efficient device of this character which can readily be made from angle iron, and which can readily be secured to the floor of a freight car, or other means of transportation.

One of the objects of my invention is to provide a device of this character which is reversible, and which is adapted to block wheels having tires of general cylindrical cross section, or flat tires, and which are arranged to prevent longitudinal movement, as well as lateral movement of the vehicles after they have been properly blocked. A further object of my invention is to provide a chock of this character which is arranged to block the front and rear wheel of different automobiles or vehicles.

The precise nature of my invention will be best understood by reference to the accompanying drawings, which will now be described, it being premised, however, that changes may be made in the details of construction of the chock without departing from the spirit and scope of my invention as defined in the appended claims.

In the drawings the numerals 2 and $2^a$ designate automobiles which have been blocked by my improved chocks 3 and $3^a$, the chock 3 is placed in such a position so as to block the front wheel of the automobile 2, as well as the rear or front wheel of another automobile which may be placed in front thereof, while the chock $3^a$ is placed to block the rear wheel of the automobile 2 and the front wheel of the automobile $2^a$. The wheels of the automobiles are lashed to the chocks by means of straps 4 which pass through openings or eyes formed in the chocks, and which will be hereinafter referred to.

The chocks 3 are each provided with legs 5, which extend upwardly and inwardly, and which are connected to each other at their upper ends, so that one leg forms a brace for the other leg.

Each of the legs is provided with a web 6 and a flange 7, which extends at right angles from the web, the web being arranged to receive or engage the peripheral portion of the tire of the wheel to prevent longitudinal movement of the vehicle, while the flange 7 is arranged to engage the side of the tire of the wheel to prevent lateral movement of the vehicle.

The web and flanges of each leg are provided with through openings 8 near the ends thereof for receiving the lashing straps 4, for lashing the wheels against the chocking blocks, to prevent upward movement of the vehicle.

In the drawings I have shown the chock members formed from angle iron, the structure shown in Figs. 1 to 3 being formed from a blank which is cut in a manner shown in Fig. 5.

In this figure the web member $6^a$ is split along the lines 9 to form the feet 10 and 11 which extend laterally from the web and flanges, respectively. The flange $7^a$ of this blank is also cut as indicated at 12 to form the flange members of the legs. After the blank has been cut as above described, the web $6^a$ is bent along the dotted line 13 to form the connecting member between the two legs of the structure, while the members 10 and 11 respectively are bent laterally along the lines 14 and 15 to form the feet extending from the webs and flanges respectively.

In Fig. 4 I have shown a form in which the legs are separated somewhat more than in the structure shown in Figs. 1 and 2. In this construction the flange member is cut at two points and bent at two points, so as to form a horizontal tie member 16 between the upper ends of the two legs. The form shown in Fig. 4 is more adaptable for blocking two large automobiles in alinement with each other, in which the body or other portions of the automobiles extend a considerable distance in advance or in front of the wheels.

It will be readily understood by those familiar with the art, that the device could readily be formed without slitting the members, but in which case it might be desirable to heat the parts before shaping.

The advantages of my invention result from the provision of a chock having two legs extending upwardly and toward each other, and which are connected at the upper ends so that one leg will form a brace for the other, each of said legs having a web and a flange extending at approximately right angles thereto; the arrangement being such that the chocks are reversible for different sides of the car and different ends of the car, and in which the web members are arranged to engage the periphery of the tires, while the flanges are arranged to engage the sides of the tires.

Also the provision of a chock which can readily be formed from angle iron, so that no special tools are required for constructing the chock is an advantage.

I claim:

1. A chock for blocking vehicles having two upwardly and inwardly inclined legs connected to each other at their upper ends, each of said legs having a web and a right angle flange at one edge thereof; substantially as described.

2. A chock for blocking vehicles having two upwardly and inwardly inclined legs connected to each other at their upper ends, each of said legs having a web and a right angle flange at one edge thereof, said webs and flanges also being provided with lashing openings near their outer edges, and a securing foot at the lower end of each web; substantially as described.

3. A chock for blocking vehicles having two upwardly and inwardly inclined legs connected to each other at their upper ends, each of said legs having a web and a right angle flange at one edge thereof, said webs and flanges also being provided with lashing openings near their outer edges, and a securing foot at the lower end of each web and each flange; substantially as described.

4. A chock for blocking vehicles of inverted V-form, each of said members acting as a brace for the other member, each leg member having a web and a right angle flange, and a foot connected to the lower end of each of said members; substantially as described.

In testimony whereof, I have hereunto set my hand.

PEARL A. BOLOPUE.

Witnesses:
JESSE B. HELLER,
H. M. CORWIN.